Jan. 15, 1957 R. WALLACE 2,777,198
MOTOR-DRIVEN TOOTH EXTRACTOR
Filed Dec. 10, 1954
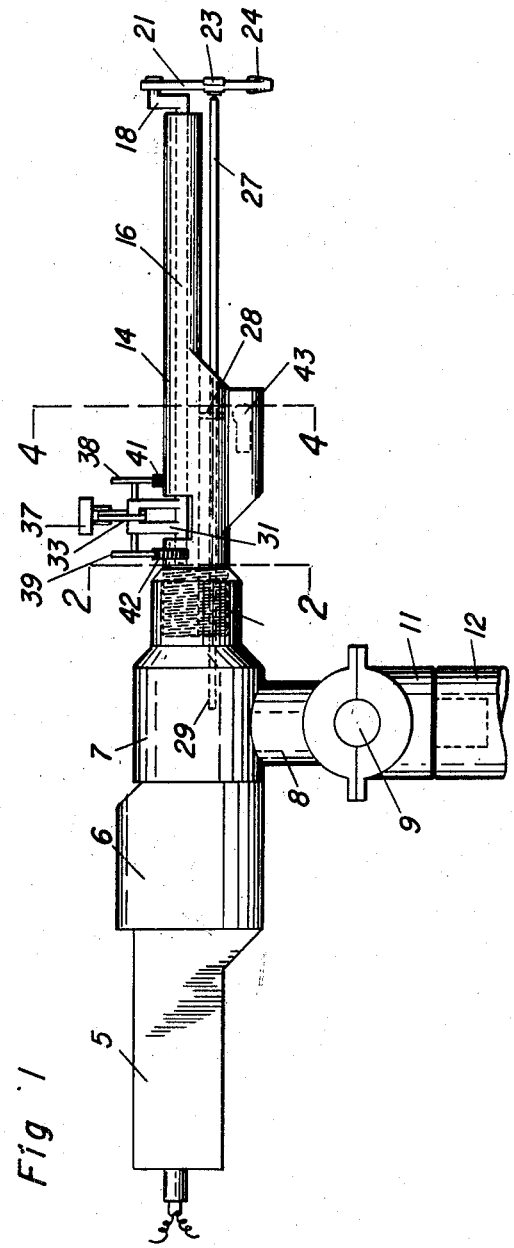
INVENTOR.
Robert Wallace
BY
Att'y

United States Patent Office 2,777,198
Patented Jan. 15, 1957

2,777,198

MOTOR-DRIVEN TOOTH EXTRACTOR

Robert Wallace, San Francisco, Calif.

Application December 10, 1954, Serial No. 474,479

1 Claim. (Cl. 32—61)

This invention relates to improvements in motor-driven tooth extractors.

The principal object of this invention is to provide a device for removing teeth of individuals through the use of a motor-driven pair of forceps.

A further object is to provide means for vibrating the tooth to be extracted at a very rapid rate so as to break down the connecting tissues between the jaw bone and the tooth.

A further object is to produce a device of this character which will eliminate the excessive strain on the jaw of a patient.

A further object is to produce a device which will lift the tooth out of the jaw, so to speak, in counterdistinction to the yanking and tearing free of the tooth with an upward or downward movement, as the case might be.

Other objects and advantages will be apparent during the course of the following description.

In the accompanying drawings forming a part of this specification and in which like numbers are employed to designate like parts throughout the same, Fig. 1 is a side elevation of my tooth extractor;

Fig. 2 is an enlarged cross-sectional view taken on the line 2—2 of Fig. 1;

Fig. 3 is an end elevation of the tooth forceps; and

Fig. 4 is an enlarged cross-sectional view taken on the line 4—4 of Fig. 1.

In practicing dentistry it is common to pull or extract teeth which heretofore has been accomplished with the use of various forms of forceps which are inserted into the mouth of the patient to grip a tooth to be pulled, after which the dentist or surgeon pinches the handles of the forceps to tightly grip the tooth, and then, by main force, he rotates the tooth in its socket or jiggles it back and forth, and then, with an upward or downward movement, depending on whether the tooth is in the lower or upper jaw, attempts to remove the tooth from its socket.

It often occurs that due to the tight gripping of the handles of the forceps, that the tooth will be crushed. It is then necessary to use elevators, picks, and other devices to recover the broken portions of the tooth that remain in the jaw. It is sometimes necessary to chisel into the jaw bone to complete the extraction.

Applicant has therefore devised a means for extracting a tooth with a minimum of danger of injury to the tooth or the jaw of a patient. This is accomplished by using a pair of forceps which are connected to an arm. After the forceps are engaged with a tooth, a motor is activated, which motor transmits to and through the forceps to the tooth a high-frequency vibration. The vibration is great enough to cause a breaking down of the tissues surrounding the tooth and which at times are entwined with the roots. Then by a slight upward or downward movement of the arm, the tooth will be lifted or lowered from its socket, depending on whether it is a lower or an upper tooth. Thus is eliminated the severe jerking and pulling on the patient's jaw and face.

In the accompanying drawings, wherein for the purpose of illustration is shown a preferred embodiment of my invention, the numeral 5 designates the handle of a motor housing 6, having a projecting casing 7. This casing has a downwardly extending support 8, which is pivoted as at 9 to a fitting 11 which is rotatably mounted in a standard 12. This standard is movably supported at a point adjacent to the dental chair in which a patient is seated.

Threadedly secured in an extension 13 of the casing 7 is a substantially tubular member 14 within which is rotatably mounted a pair of parallel rods 16 and 17. Each of these rods is provided with a crank, as shown at 18 and 19 respectively.

These cranks are slidably secured to the upper ends 21 and 22 respectively of a pair of forceps pivoted as at 23 and having tooth-engaging portions 24 and 26 which are adapted to engage a tooth as shown at A.

A rod 27 forms an extension of the pivot 23 and extends through the tubular member 14 and is pivoted therein as shown at 28, and has its free end 29 connected to the motor in the projecting casing 7 of the motor housing 6.

The rods 16 and 17 each has an upstanding arm as shown at 31 and 32 respectively, which extends upwardly through the tubular member 14, and having their free ends connected to toggle links 33 and 34, which links are in turn pivoted at 36 to a thumb piece 37.

At 38 and 39 I have shown two dogs which engage racks 41 and 42 respectively, which dogs are connected to the toggle links 33 and 34.

It will here be noted, by viewing Fig. 4, that these dogs operate in opposite direction, the purpose of which will be later seen.

At 43 I have shown a light bulb which directs its rays toward the forceps.

The result of this construction is that when the standard 12 is moved toward the patient, the tubular portion 14, together with the forceps, may be inserted in the mouth of the patient until the forceps are properly adjusted over the tooth to be extracted. (In the present instance I have shown the device for pulling a lower tooth, but it is obvious that it may be rotated so as to pull an upper tooth.)

After the forceps have engaged the tooth, the operator pushes downwardly on the thumb piece 37, which causes the toggle links 33 and 34 to cause the pivotal connection with the arms 31 and 32 to move away from each other, thus rotating the rods 16 and 17 and tending to spread the upper ends of the forceps, thus causing the forceps to tightly engage the tooth.

Simultaneously with the spreading of the pivotal point of the links 33 and 34, the same will cause the dogs 38 and 39 to move over their respective ratchets and to prevent retrograde movement, thus maintaining the forceps tightly gripped to the tooth.

Now the motor in the housing 6 is turned on, with the result that high-frequency vibrations will be transmitted from the motor to the pivot 27 and its pivotal connection 28, to the pivotal point 23 of the forceps. These high frequency vibrations will tend to loosen the tooth from its socket and then, by pressing downwardly slightly on the handle 5, the tooth will be lifted out of its socket with a minimum amount of discomfort to the patient and danger to the jaw.

It is apparent that the forceps may be removed for sterilization or for changing the shape or type of forceps to suit different purposes.

It will thus be seen that my device will accomplish all of the objects above set forth. It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a device of the character described, a support, a bracket universally mounted on said support, a motor housing rotatably supported in said bracket, a tubular member extending from said motor housing, a pair of rods rotatably mounted in said tubular member, each of said rods having a crank formed on the end thereof, a pair of pivoted forceps secured to said cranks, whereby rotation of said rods will cause said forceps to open and close for the engagement of a tooth therewith, the opposite ends of said rods from said cranks having a toggle connection for simultaneous movement of said rods about their axes, means for preventing retrograde movement of said rods when said forceps are in intimate engagement with a tooth, a motor mounted in said housing and a flexible rod extending from said motor to said forceps for transmitting high-frequency vibrations from said motor to said forceps.

References Cited in the file of this patent

UNITED STATES PATENTS 1,771,712     Jimerson                July 29, 1930

FOREIGN PATENTS 555,330     Germany                July 21, 1932